(12) United States Patent
Ichikawa et al.

(10) Patent No.: US 12,441,480 B2
(45) Date of Patent: Oct. 14, 2025

(54) AIRCRAFT

(71) Applicant: HONDA MOTOR CO., LTD., Tokyo (JP)

(72) Inventors: Azuki Ichikawa, Wako (JP); Yuichi Fukuchi, Wako (JP); Hikari Hirayanagi, Wako (JP); Takuya Kubota, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/621,513

(22) Filed: Mar. 29, 2024

(65) Prior Publication Data

US 2024/0327020 A1    Oct. 3, 2024

(30) Foreign Application Priority Data

Mar. 30, 2023   (JP) ................... 2023-055297

(51) Int. Cl.
*B64D 33/10*    (2006.01)
*B64D 27/32*    (2024.01)
*B64C 29/00*    (2006.01)

(52) U.S. Cl.
CPC ............ *B64D 33/10* (2013.01); *B64D 27/32* (2024.01); *B64C 29/0008* (2013.01)

(58) Field of Classification Search
CPC .................. B64D 33/08; B64D 33/10
See application file for complete search history.

(56) References Cited

U.S. PATENT DOCUMENTS

| | | | |
|---|---|---|---|
| 10,167,084 B2 | 1/2019 | Stieger et al. | |
| 10,316,693 B2 | 6/2019 | Stolte et al. | |
| 2013/0091850 A1 | 4/2013 | Francisco | |
| 2022/0112846 A1* | 4/2022 | Dionne | B64C 11/14 |

FOREIGN PATENT DOCUMENTS

KR    20100109717 A   * 10/2010  ............. B64D 33/10

OTHER PUBLICATIONS

Merged image and translation of KR 20100109717 (Year: 2010).*

* cited by examiner

*Primary Examiner* — Nicholas McFall
(74) *Attorney, Agent, or Firm* — Rankin, Hill & Clark LLP

(57) ABSTRACT

An aircraft including a fuselage with a cooling unit including a first radiator, a second radiator, a first cooling fan and a second cooling fan for taking air outside the fuselage into the fuselage and supplying air to the first radiator and the second radiator. The aircraft has an exhaust orifice for discharging air delivered into the interior of the fuselage, the cooling unit is arranged forward of the engine in the fuselage, and the exhaust orifice is positioned rearward of the engine in the fuselage.

8 Claims, 6 Drawing Sheets

AIRCRAFT

CROSS-REFERENCE TO RELATED APPLICATIONS

This application is based upon and claims the benefit of priority from Japanese Patent Application No. 2023-055297 filed on Mar. 30, 2023, the contents of which are incorporated herein by reference.

BACKGROUND OF THE INVENTION

Field of the Invention

The present invention relates to an aircraft.

Description of the Related Art

In recent years, efforts toward realization of low-carbon or decarbonized society have been activated, and research and development have been conducted for reducing $CO_2$ emission and improving energy efficiencies also in aircrafts.

For example, US 2013/0091850 A1 discloses an aircraft in which an engine (gas turbine engine) that generates heat is disposed inside the fuselage.

SUMMARY OF THE INVENTION

There is a demand for an aircraft capable of suppressing overheating of components provided inside the aircraft with a simple configuration.

An object of the present invention is to solve the above-described problems.

An aspect of the present invention is to provide an aircraft including: a fuselage; an engine disposed in an interior of the fuselage; and an exhaust orifice, wherein inside the fuselage, a cooling unit including a radiator and a cooling fan are provided, the radiator being configured to cool at least one of a motor that generates a thrust on the aircraft or a power conversion device that supplies power to the motor, the cooling fan being configured to supply air outside the fuselage to the radiator and deliver the air to the interior of the fuselage, the air delivered to the interior of the fuselage is discharged through the exhaust orifice, the cooling unit is arranged forward of the engine in the fuselage, and the exhaust orifice is arranged rearward of the engine in the fuselage.

According to the present invention, overheating of components provided inside the aircraft can be suppressed with a simple configuration.

The above and other objects, features, and advantages of the present invention will become more apparent from the following description when taken in conjunction with the accompanying drawings, in which a preferred embodiment of the present invention is shown by way of illustrative example.

DETAILED DESCRIPTION OF THE INVENTION

Figure 1:
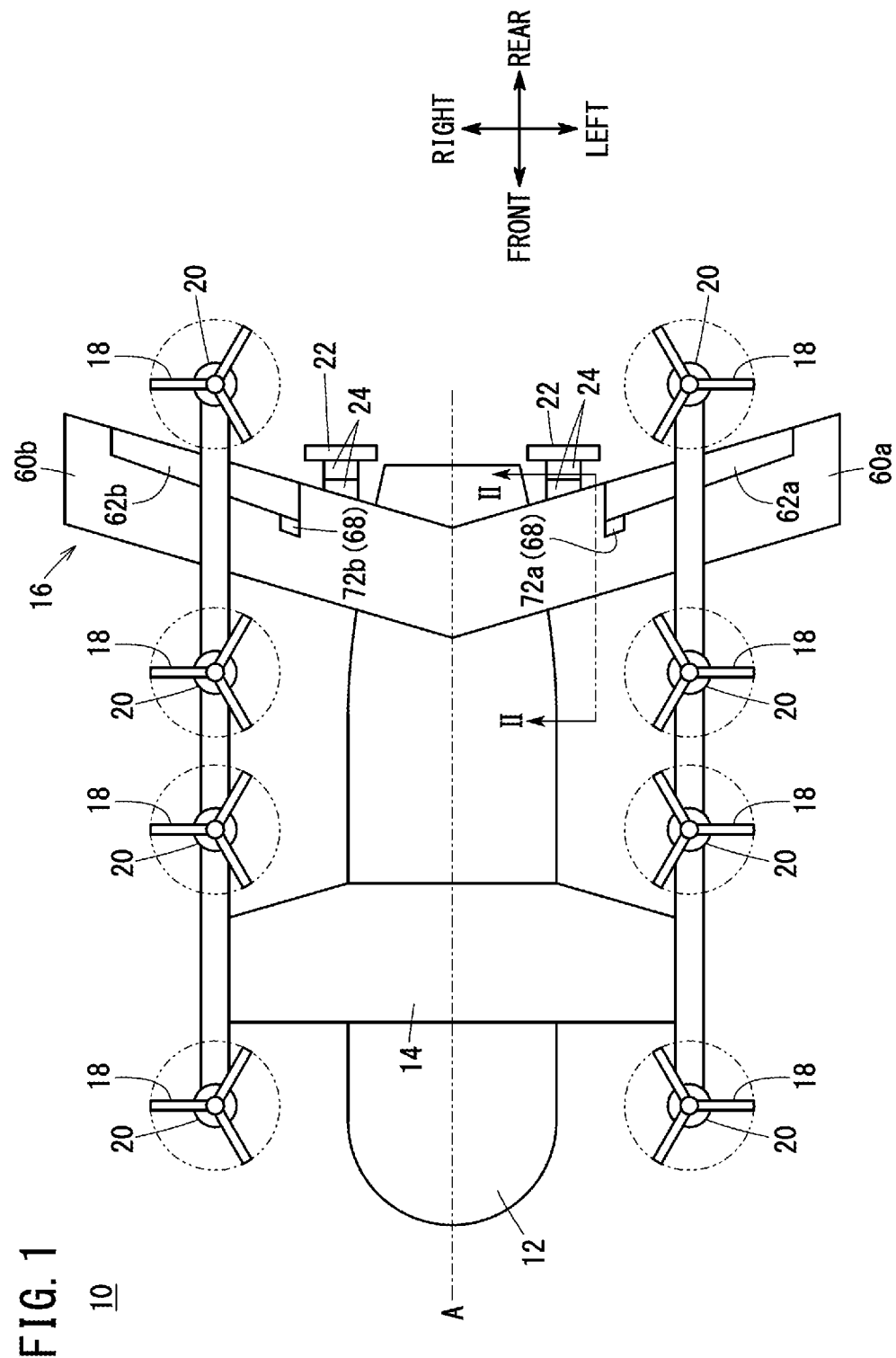
FIG. 1 is a schematic view of an aircraft according to an embodiment of the present invention.

An aircraft 10 according to an embodiment of the present invention will be described below with reference to the drawings. As shown in FIG. 1, the aircraft 10 according to the present embodiment is, for example, an electric vertical takeoff and landing (eVTOL) aircraft.

The aircraft 10 has a fuselage 12, a front wing 14, a rear wing 16, eight VTOL rotors 18, eight VTOL motors 20, two cruise rotors 22, and four cruise motors 24. The fuselage 12 extends in the front-rear direction of the aircraft 10. The front wing 14 is attached to the fuselage 12 at a portion forward of the center of the fuselage in the front-rear direction. The rear wing 16 is attached to the fuselage 12 at a portion rearward of the center of the fuselage in the front-rear direction.

The VTOL rotors 18 generate an upward thrust on the aircraft 10. One VTOL motor 20 is connected to each VTOL rotor 18. The VTOL motors 20 are electrical motors for rotating the VTOL rotors 18. The cruise rotors 22 generate a thrust in the horizontal direction on the aircraft 10. Two cruise motors 24 are connected to each cruise rotor 22. The cruise motors 24 are electrical motors for rotating the cruise rotors 22. In FIGS. 2, 3, 5 and 6, the cruise rotors 22 are omitted from illustration.

The number and arrangement of the VTOL rotors 18, the VTOL motors 20, the cruise rotors 22, and the cruise motors 24 can be set as desired. Only one cruise motor 24 may be connected to each cruise rotor 22.

Figure 2:
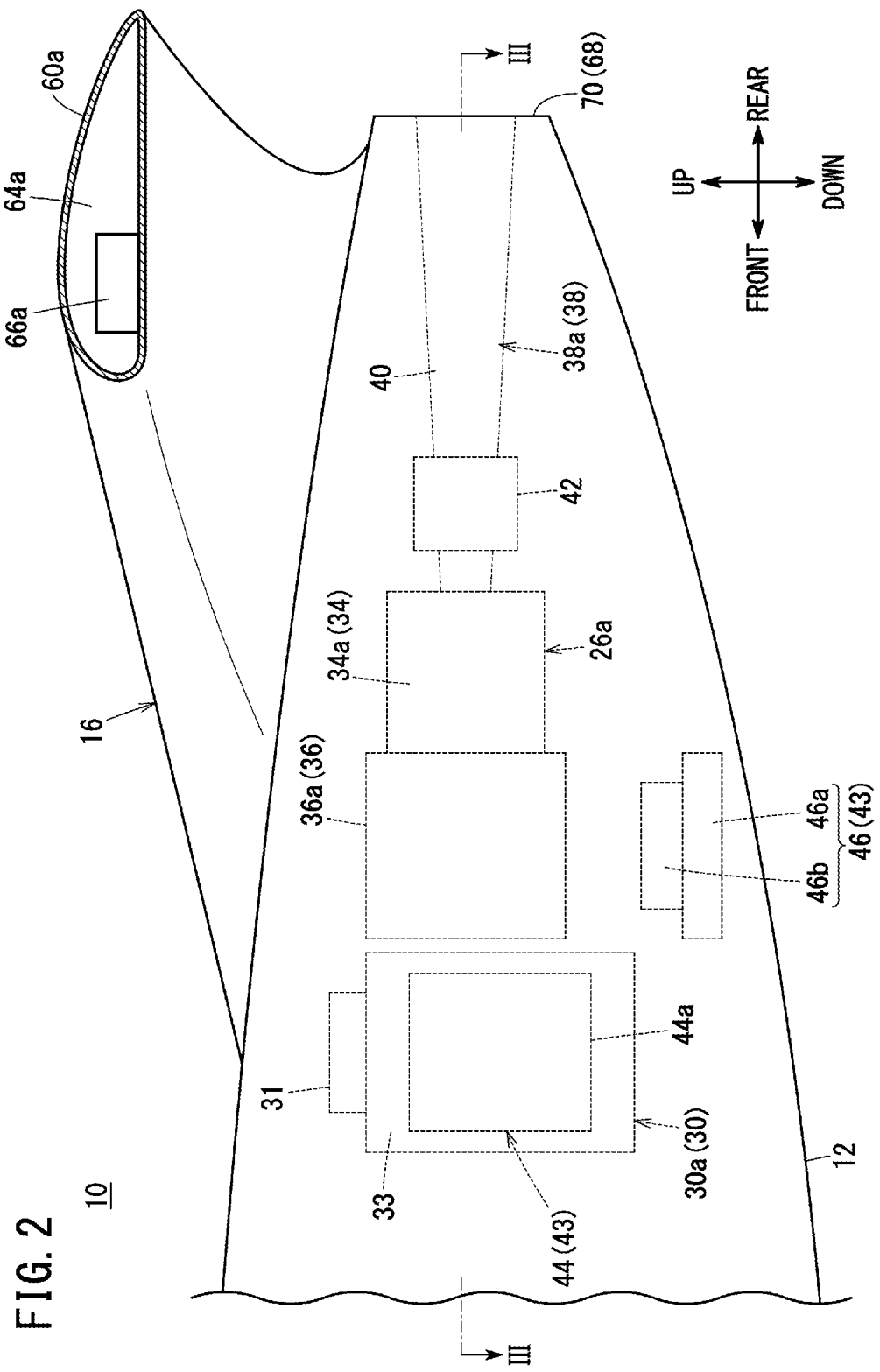
FIG. 2 is a side view with a partial cross-sectional view taken along line II-II of FIG. 1.
Figure 3:
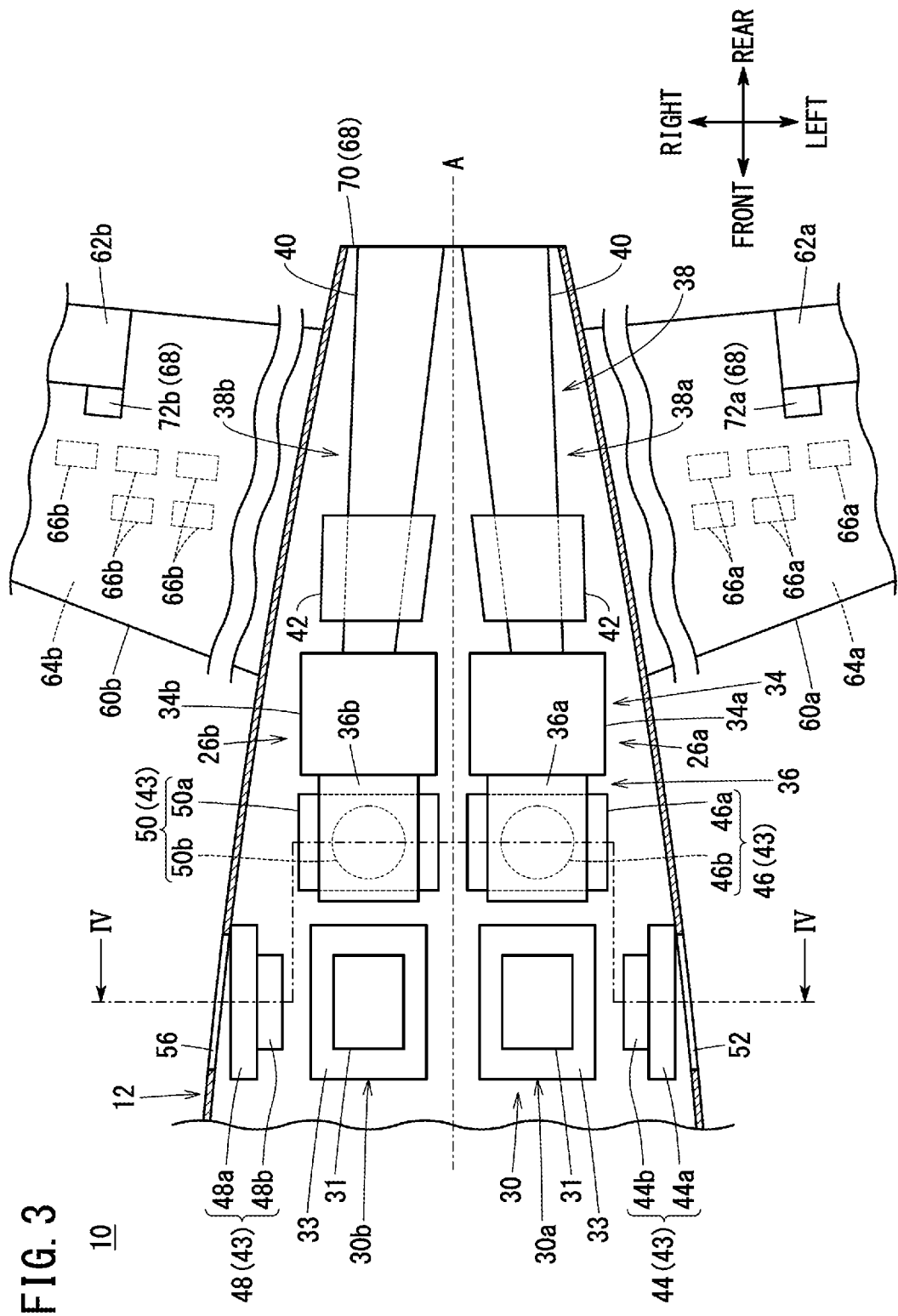
FIG. 3 is a plan view of a rear part of the aircraft with a partial cross-sectional view.

As shown in FIGS. 2 and 3, a first power generation module 26a, a second power generation module 26b, first electronic equipment 30a, and second electronic equipment 30b are disposed inside the fuselage 12. The first power generation module 26a is arranged on the left of the center line A in the left-right direction of the fuselage 12. The second power generation module 26b is arranged on the right of the center line A. The first power generation module 26a and the second power generation module 26b are disposed symmetrically with respect to the center line A. The first power generation module 26a and the second power generation module 26b may not be disposed symmetrically with respect to the center line A. The number of power generation modules disposed inside the fuselage 12 is not limited to two, i.e., the first power generation module 26a and the second power generation module 26b, and may be one or three or more.

The first power generation module 26a includes a first engine 34a, a first rotating electric machine 36a, and a first exhaust device 38a. The first engine 34a, for example, is a gas turbine engine. The first engine 34a generates high-temperature combustion gas by burning fuel, and drives a turbine (not shown) by the combustion gas. The first engine 34a is not limited to a gas turbine engine, and may be an appropriate internal-combustion engine or an external-combustion engine.

The first rotating electric machine 36a is connected to the first engine 34a. The first rotating electric machine 36a functions as, for example, a generator that generates electric power by being driven by the first engine 34a. Further, the first rotating electric machine 36a functions as, for example, a motor for rotating a compressor (not shown) at the time of starting the first engine 34a. The first rotating electric machine 36a is arranged forward of the first engine 34a in the fuselage 12.

The first exhaust device 38a is connected to the first engine 34a. The first exhaust device 38a guides the high-temperature exhaust gas discharged from the first engine 34a to the outside of the fuselage 12. The first exhaust device 38a is arranged rearward of the first engine 34a in the fuselage 12.

The first exhaust device 38a includes an exhaust pipe 40 and a gas mixing section 42. The exhaust pipe 40 is a diffuser extending from the first engine 34a toward the rear of the fuselage 12. A rear end of the exhaust pipe 40 is positioned at a rear end of the fuselage 12. The gas mixing section 42 is connected to the exhaust pipe 40. The high-temperature exhaust gas flowing through the exhaust pipe 40 is mixed with the cooling gas in the gas mixing section 42.

As shown in FIG. 3, the second power generation module 26b includes a second engine 34b, a second rotating electric machine 36b, and a second exhaust device 38b. The second power generation module 26b has the same configuration as the first power generation module 26a. Therefore, detailed descriptions of the configuration of the second power generation module 26b will be omitted.

In the following descriptions, the first engine 34a and the second engine 34b may be collectively referred to as engines 34. The first rotating electric machine 36a and the second rotating electric machine 36b may be collectively referred to as rotating electric machines 36. Further, the first exhaust device 38a and the second exhaust device 38b may be collectively referred to as exhaust devices 38.

The first electronic equipment 30a is arranged on the left of the center line A. The second electronic equipment 30b is arranged on the right of the center line A. The first electronic equipment 30a and the second electronic equipment 30b are disposed symmetrically with respect to the center line A. The first electronic equipment 30a and the second electronic equipment 30b are separated from each other in the left-right direction of the fuselage 12. The first electronic equipment 30a and the second electronic equipment 30b may not be disposed symmetrically with respect to the center line A.

The first electronic equipment 30a is arranged forward of the first rotating electric machine 36a in the fuselage 12. The first electronic equipment 30a is provided with electronic devices. The first electronic equipment 30a includes, for example, a power conversion device 31 and an electrical power device 33. The power conversion device 31 supplies electric power to the VTOL motors 20 and the cruise motors 24. The power conversion device 31 includes, for example, a plurality of inverters for driving the VTOL motors 20 and the cruise motors 24.

The electrical power device 33 is, for example, a junction box. The electrical power device 33 includes, for example, two electrical circuits. Each of the electrical circuits connects a power control unit (not shown) and a plurality of electrical loads. The power control unit converts AC electrical power generated by the rotating electric machines 36 into DC electrical power. The electrical loads include, for example, two VTOL motors 20, one cruise motor 24, and one battery. The electrical loads may include an electronic device other than the VTOL motors 20, the cruise motor 24, and the battery. The configuration of the electrical power device 33 can be set as appropriate.

The first electronic equipment 30a may include only one of the power conversion device 31 and the electrical power device 33. The first electronic equipment 30a may include a power control unit that converts AC electrical power generated by the rotating electric machines 36 into DC electrical power.

The second electronic equipment 30b is arranged forward of the second rotating electric machine 36b in the fuselage 12. The second electronic equipment 30b is configured in the same manner as the first electronic equipment 30a. Therefore, detailed descriptions of the configuration of the second electronic equipment 30b will be omitted.

In the following description, the first electronic equipment 30a and the second electronic equipment 30b may be collectively referred to as electronic equipment 30.

Figure 4:
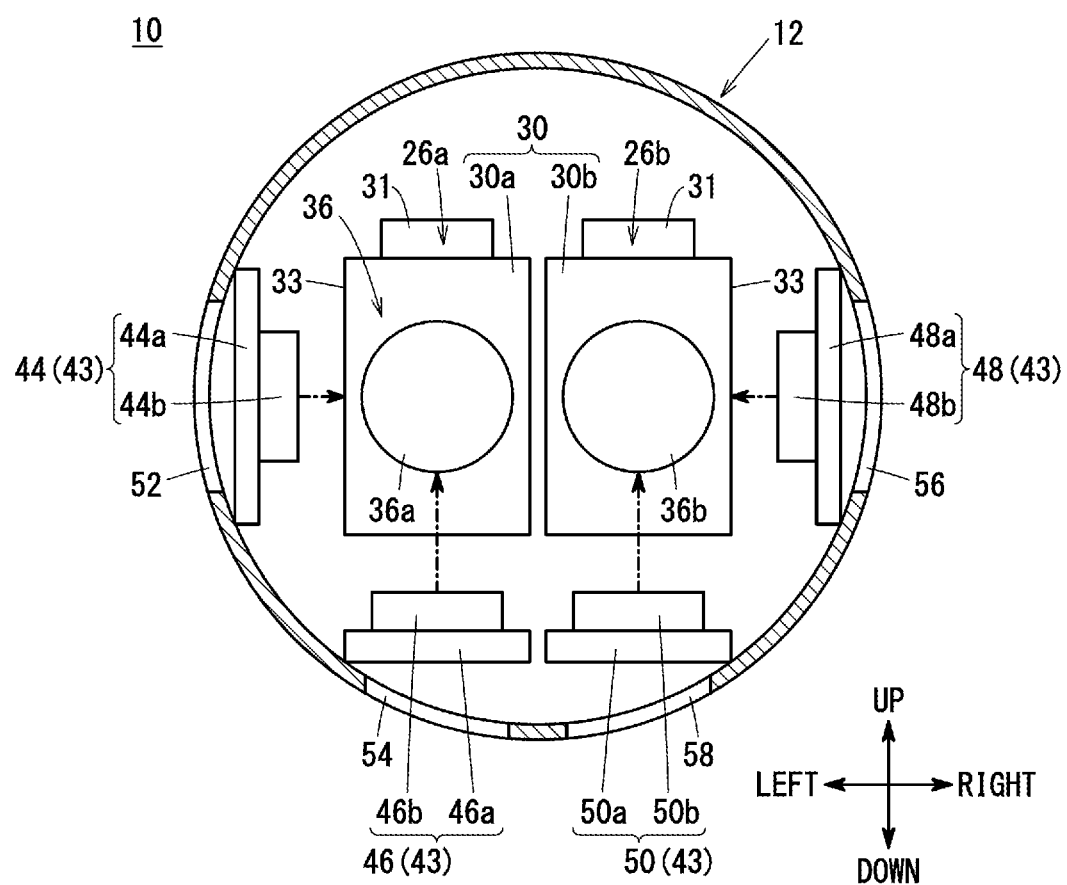
FIG. 4 is a cross-sectional view taken along line IV-IV of FIG. 3.

As shown in FIGS. 3 and 4, four cooling units 43 are arranged inside the fuselage 12. The four cooling units 43 are arranged forward of the engines 34 in the fuselage 12. The four cooling units 43 include two first cooling units 44, 48 and two second cooling units 46, 50. The first cooling unit 44 and the second cooling unit 46 are arranged on the left of the center line A of the fuselage 12. The first cooling unit 48 and the second cooling unit 50 are arranged on the right of the center line A of the fuselage 12.

The first cooling unit 44 is arranged on the left of the first electronic equipment 30a in the fuselage 12. The first cooling unit 44 includes a first radiator 44a and a first cooling fan 44b. A cooling medium flows through the first radiator 44a. The cooling medium that has flowed through the first radiator 44a cools the two VTOL motors 20 and the one cruise motor 24 connected to one of the electrical circuits of the electrical power device 33 of the first electronic equipment 30a. Further, the cooling medium that has flowed through the first radiator 44a cools the power conversion device 31 of the first electronic equipment 30a. In particular, the cooling medium that has flowed through the first radiator 44a cools the inverters corresponding to the two VTOL motors 20 and the one cruise motor 24 to be cooled.

The first radiator 44a is formed in a flat plate shape as a whole. A first inlet 52 is formed in the fuselage 12. The first inlet 52 and the first radiator 44a face each other. That is, the first inlet 52 is positioned on the left of the first radiator 44a in the fuselage 12.

The first cooling fan 44b is disposed between the first radiator 44a and the first electronic equipment 30a. The first cooling fan 44b is spaced from the first electronic equipment 30a so that air can flow therebetween. The first cooling fan 44b draws air outside the fuselage 12 into the fuselage 12 through the first inlet 52. The first cooling fan 44b supplies the air taken into the fuselage 12 to the first radiator 44a.

The second cooling unit 46 is arranged downward of the first rotating electric machine 36a. The second cooling unit 46 includes a second radiator 46a and a second cooling fan 46b. A cooling medium flows through the second radiator 46a. The cooling medium that has flowed through the second radiator 46a cools the two VTOL motors 20 and the one cruise motor 24 connected to the other of the electrical circuits of the electrical power device 33 of the first electronic equipment 30a. Further, the cooling medium that has flowed through the second radiator 46a cools the power conversion device 31 of the first electronic equipment 30a. In particular, the cooling medium that has flowed through the second radiator 46a cools the inverters corresponding to the two VTOL motors 20 and the one cruise motor 24 to be cooled.

The second radiator 46a is formed in a flat plate shape as a whole. As shown in FIG. 4, a second inlet 54 is formed in the fuselage 12. The second inlet 54 and the second radiator 46a face each other. That is, the second inlet 54 is positioned downward of the second radiator 46a.

The second cooling fan 46b is disposed between the second radiator 46a and the first rotating electric machine 36a. The second cooling fan 46b is spaced from the first rotating electric machine 36a so that air can flow therebetween. The second cooling fan 46b draws air outside the fuselage 12 into the fuselage 12 through the second inlet 54. The second cooling fan 46b supplies the air taken into the fuselage 12 to the first rotating electric machine 36a.

As shown in FIGS. 3 and 4, the first cooling unit 48 is disposed on the right of the second electronic equipment 30b in the fuselage 12. That is, the first cooling unit 44 and the first cooling unit 48 are disposed so as to sandwich the electronic equipment 30 from both sides in the left-right direction of the fuselage 12. The first cooling unit 48 includes a first radiator 48a and a first cooling fan 48b. A cooling medium flows through the first radiator 48a. The cooling medium that has flowed through the first radiator 48a cools the two VTOL motors 20 and the one cruise motor 24 connected to one of the electrical circuits of the electrical power device 33 of the second electronic equipment 30b. Further, the cooling medium that has flowed through the first radiator 48a cools the power conversion device 31 of the second electronic equipment 30b. In particular, the cooling medium that has flowed 0through the first radiator 48a cools the inverters corresponding to the two VTOL motors 20 and the one cruise motor 24 to be cooled.

The first radiator 48a is formed in a flat plate shape as a whole. A third inlet 56 is formed in the fuselage 12. The third inlet 56 and the first radiator 48a face each other. That is, the third inlet 56 is positioned on the right of the first radiator 48a in the fuselage 12.

The first cooling fan 48b is disposed between the first radiator 48a and the second electronic equipment 30b. The first cooling fan 48b is spaced from the second electronic equipment 30b so that air can flow therebetween. The first cooling fan 48b draws air outside the fuselage 12 into the fuselage 12 through the third inlet 56. The first cooling fan 48b supplies the air taken into the fuselage 12 to the first radiator 48a.

The second cooling unit 50 is disposed downwardly of the second rotating electric machine 36b. The second cooling unit 50 includes a second radiator 50a and a second cooling fan 50b. A cooling medium flows through the second radiator 50a. The cooling medium that has flowed through the second radiator 50a cools the two VTOL motors 20 and the one cruise motor 24 connected to the other of the electrical circuits of the electrical power device 33 of the second electronic equipment 30b. Further, the cooling medium that has flowed through the second radiator 50a cools the power conversion device 31 of the second electronic equipment 30b. The cooling medium that has flowed through the second radiator 50a cools the inverters corresponding to the two VTOL motors 20 and the one cruise motor 24 to be cooled.

The second radiator 50a is formed in a flat plate shape as a whole. As shown in FIG. 4, a fourth inlet 58 is formed in the fuselage 12. The fourth inlet 58 and the second radiator 50a face each other. That is, the fourth inlet 58 is positioned downward of the second radiator 50a.

The second cooling fan 50b is disposed between the second radiator 50a and the second rotating electric machine 36b. The second cooling fan 50b is spaced from the second rotating electric machine 36b so that air can flow therebetween. The second cooling fan 50b draws air outside the fuselage 12 into the fuselage 12 through the fourth inlet 58. The second cooling fan 50b supplies the air taken into the fuselage 12 to the second rotating electric machine 36b.

As shown in FIG. 1, the rear wing 16 includes a left wing 60a and a right wing 60b. The left wing 60a and the right wing 60b are connected to the fuselage 12. The left wing 60a extends leftward from the upper end of the fuselage 12 (see FIG. 2). The right wing 60b extends rightward from the upper end of the fuselage 12. The left wing 60a and the right wing 60b are positioned above the engines 34 in the fuselage 12.

The left wing 60a has a left control surface (left moving blade) 62a. The left control surface 62a is provided at the rear end of the left wing 60a. The left control surface 62a extends along the extending direction of the left wing 60a. As shown in FIGS. 2 and 3, a left communication passage 64a is provided inside the left wing 60a. The left communication passage 64a is in communication with the interior of the fuselage 12. First drive control units 66a that control the left control surface 62a are disposed in the left communication passage 64a.

As shown in FIG. 1, the right wing 60b has a right control surface (right moving blade) 62b. The right control surface 62b is provided at the rear end of the right wing 60b. The right control surface 62b extends along the extending direction of the right wing 60b. As shown in FIG. 3, a right communication passage 64b is provided inside the right wing 60b. The right communication passage 64b is in communication with the interior of the fuselage 12. Second drive control units 66b that control the right control surface 62b are disposed in the right communication passage 64b.

As shown in FIGS. 1 to 3, the aircraft 10 has a plurality of exhaust orifices 68 for discharging air inside the fuselage 12 to the outside. The exhaust orifices 68 are positioned rearward of the first engine 34a and the second engine 34b in the fuselage 12. The aircraft 10 includes a fuselage exhaust orifice 70, a first wing vent 72a, and a second wing vent 72b, as the plurality of exhaust orifices 68.

As shown in FIG. 3, the fuselage exhaust orifice 70 is provided at the rear end portion of the fuselage 12. The fuselage exhaust orifice 70 is provided between the rear end of the exhaust devices 38 and the rear end of the fuselage 12.

As shown in FIGS. 1 and 3, the first wing vent 72a is provided in the upper surface of the left wing 60a. The first wing vent 72a is in communication with the left communication passage 64a. The first wing vent 72a is positioned in the vicinity of the left control surface 62a. The first drive control units 66a are disposed in the left communication passage 64a in an area from the inside of the fuselage 12 to the first wing vent 72a (see FIG. 3).

The second wing vent 72b is provided in the upper surface of the right wing 60b. The second wing vent 72b is in communication with the right communication passage 64b. The second wing vent 72b is positioned in the vicinity of the right control surface 62b. The second drive control units 66b are disposed in the right communication passage 64b in an area from the inside of the fuselage 12 to the second wing vent 72b.

In such an aircraft 10, the first engine 34a and the second engine 34b become high in temperature due to generation of combustion gas during driving. Components provided inside the aircraft 10, such as the first rotating electric machine 36a, the second rotating electric machine 36b, the first electronic equipment 30a, the second electronic equipment 30b, the first drive control units 66a, and the second drive control units 66b, may be overheated by the first engine 34a and the second engine 34b.

In the present embodiment, when the first cooling fans 44b are driven, air outside the fuselage 12 is taken into the fuselage 12 from the first inlet 52 to the right. The air flows through the first radiator 44a, and then is guided to the first electronic equipment 30a. Thus, the first electronic equipment 30a is cooled suitably.

When the second cooling fan 46b is driven, air outside the fuselage 12 flows upward into the fuselage 12 through the second inlet 54. The air flows through the second radiator 46a, and then is guided to the first rotating electric machine 36a. Thus, the first rotating electric machine 36a is cooled suitably.

Figure 5:
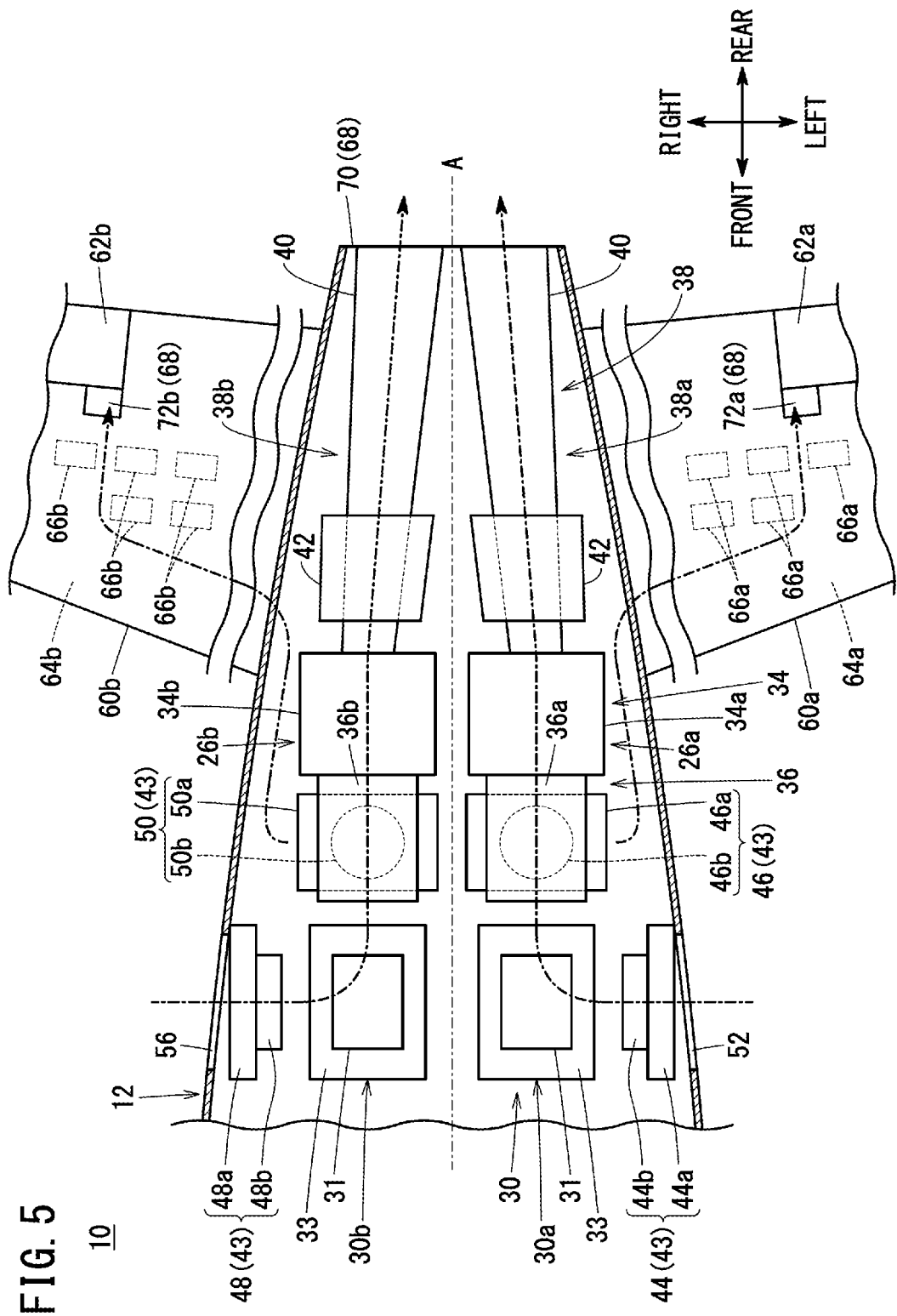
FIG. 5 is a diagram illustrating airflow inside the aircraft.
Figure 6:
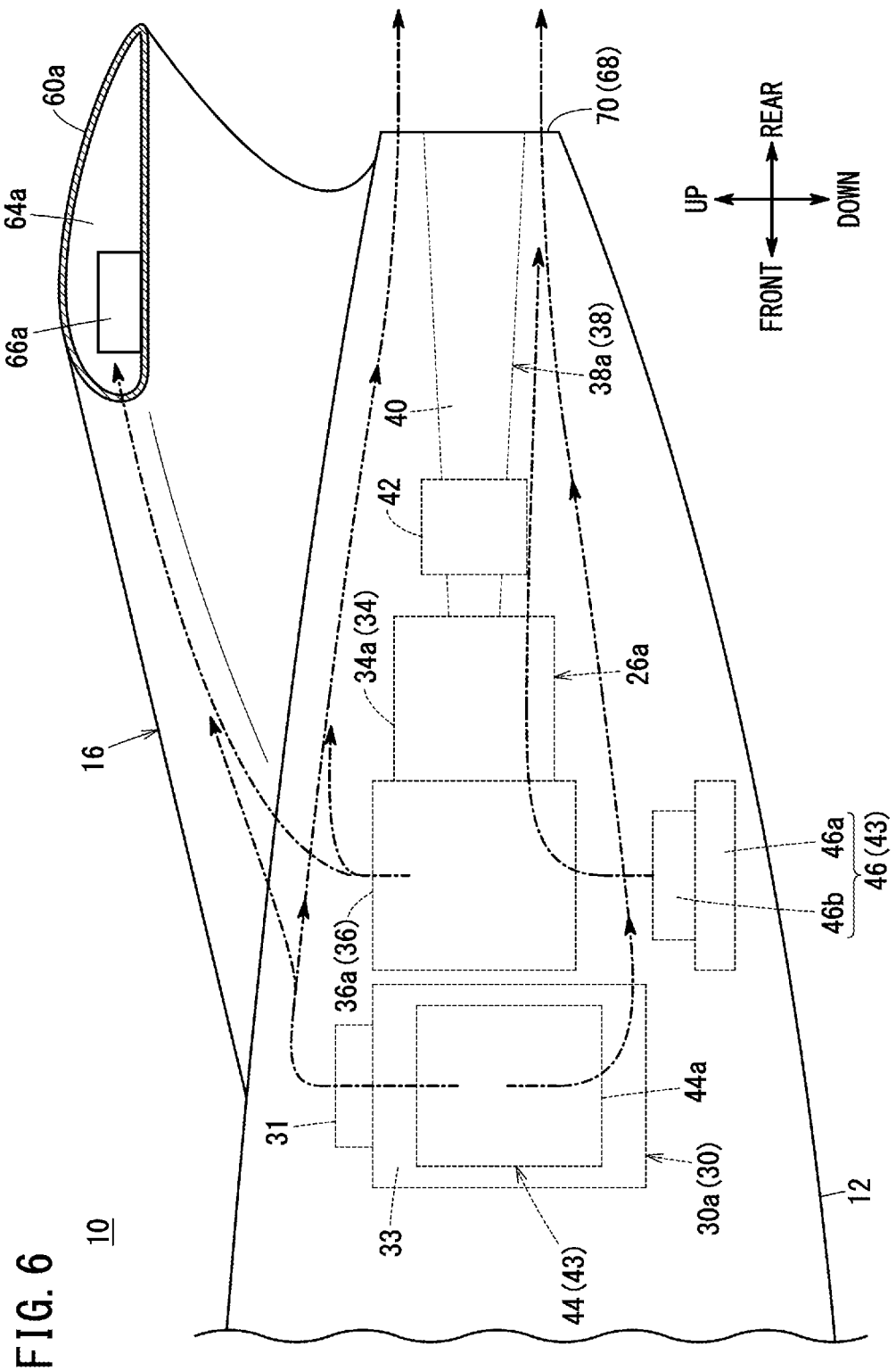
FIG. 6 is a diagram illustrating airflow inside the aircraft.

As shown in FIGS. 5 and 6, air taken into the fuselage 12 by the driving of the first cooling fan 44b and the second cooling fan 46b flows rearward and upward in the fuselage 12. The air that has been guided to the first electronic equipment 30a and the first rotating electric machine 36a flows rearward to the first engine 34a, and cools the first engine 34a and sweeps heated air around the first engine 34a toward the rear of the fuselage 12. In this manner, it is possible to prevent the heated air around the first engine 34a from flowing toward the first rotating electric machine 36a and the first electronic equipment 30a by, for example, air entered the fuselage 12 through the fuselage exhaust orifice 70 and flowing forward in the fuselage 12. The air further flows rearward from the first engine 34a, cools the first exhaust device 38a in the fuselage 12, and is then discharged to the outside of the fuselage 12 from the fuselage exhaust orifice 70.

Air that has flowed upward from the first electronic equipment 30a and the first rotating electric machine 36a is guided to the first drive control units 66a via the left communication passage 64a. Thus, the first drive control units 66a are cooled suitably. The air guided to the first drive control units 66a is discharged from the first wing vent 72a to the outside of the left wing 60a.

When the first cooling fan 48b is driven, air outside the fuselage 12 flows leftward into the fuselage 12 through the third inlet 56. The air flows through the first radiator 48a, and then is guided to the second electronic equipment 30b. Thus, the second electronic equipment 30b is cooled suitably.

When the second cooling fan 50b is driven, air outside the fuselage 12 flows upward into the fuselage 12 through the fourth inlet 58. The air flows through the second radiator 50a, and then is guided to the second rotating electric machine 36b. Thus, the second rotating electric machine 36b is cooled suitably.

Air taken into the fuselage 12 by the driving of the first cooling fan 48b and the second cooling fan 50b flows rearward and upward in the fuselage 12. The air that has been guided to the second electronic equipment 30b and the second rotating electric machine 36b flows rearward to the second engine 34b, and cools the second engine 34b and sweeps heated air around the second engine 34b toward the rear of the fuselage 12. In this manner, it is possible to prevent the heated air around the second engine 34b from flowing toward the second rotating electric machine 36b and the second electronic equipment 30b by, for example, air entered the fuselage 12 through the fuselage exhaust orifice 70 and flowing forward in the fuselage 12. The air further flows rearward from the second engine 34b, cools the second exhaust device 38b in the fuselage 12, and is then discharged to the outside of the fuselage 12 from the fuselage exhaust orifice 70.

Air that has flowed upward from the second electronic equipment 30b and the second rotating electric machine 36b is guided to the second drive control units 66b via the right communication passage 64b. Thus, the second drive control units 66b are cooled suitably. The air guided to the second drive control units 66b is discharged from the second wing vent 72b to the outside of the right wing 60b.

According to the present embodiment, air taken into the fuselage 12 by the cooling units 43 positioned forward of the engines 34 in the fuselage 12 can be discharged from the exhaust orifices 68 positioned rearward of the engines 34 in the fuselage 12. Thus, the engines 34 can be cooled suitably, and the radiant heat from the engines 34 can be reduced. Further, air heated by the engines 34 can be restrained from flowing forward in the fuselage 12 from the engines 34. Therefore, the components (the rotating electric machines 36 and the electronic equipment 30) provided inside the aircraft 10 at positions forward of the engines 34 can be prevented from being overheated. Further, in the present embodiment, air taken into the fuselage 12 by the first cooling fans 44b, 48b and the second cooling fans 46b, 50b provided for cooling the VTOL motors 20, the cruise motors 24 and the power conversion devices 31 is utilized to cool other components, and therefore no additional cooling fans dedicated to the other components are required. Therefore, the configuration of the aircraft 10 can be simplified.

In the present embodiment, the first cooling fans 44b, 48b and the second cooling fans 46b, 50b may be continuously driven when the aircraft 10 is not in flight and the engines 34 of the aircraft 10 are stopped, but the related components are still in a high-temperature state (the engines 34 are still hot but stopped). In this way, air heated by the engines 34 can be prevented from flowing forward in the fuselage 12 than the engines 34 while the engines 34 are still hot but stopped.

In relation to the above-described disclosure, the following supplementary notes are further disclosed.

Supplementary Note 1

An aircraft (10) including: a fuselage (12); an engine (34) disposed in an interior of the fuselage; and an exhaust orifice (68), wherein inside the fuselage, a cooling unit (43) including a radiator (44a, 46a, 48a, 50a) and a cooling fan (44b, 46b, 48b, 50b) are provided, the radiator being configured to cool at least one of a motor (20, 24) that generates a thrust on the aircraft or a power conversion device (31) that supplies power to the motor, the cooling fan being configured to supply air outside the fuselage to the radiator and deliver the air to the interior of the fuselage, the exhaust orifice being configured to discharge the air delivered to the interior of the fuselage, the cooling unit is arranged forward of the engine in the fuselage, and the exhaust orifice is arranged rearward of the engine in the fuselage.

According to such a configuration, air taken into the fuselage by the cooling unit positioned forward of the engine in the fuselage can be discharged from the exhaust orifice positioned rearward of the engine in the fuselage. Thus, the engine can be cooled suitably, and the radiant heat from the engine can be reduced. Further, air heated by the engine can be prevented from flowing forward in the fuselage than the engine. Therefore, components provided inside the aircraft can be prevented from being overheated. Further, in the present embodiment, air taken into the fuselage by the cooling fan provided for cooling the motor or the power conversion device is utilized to cool other components, and therefore no additional cooling fans dedicated to the other components are required. Thus, the configuration of the aircraft can be simplified.

Supplementary Note 2

In the aircraft according to Supplementary Note 1, in the interior of the fuselage, electronic equipment (30) including an electronic device may be arranged forward of the engine.

According to such a configuration, it is possible to prevent the electronic equipment from being overheated by heat generated by the engine.

Supplementary Note 3

The aircraft according to Supplementary Note 2 may further include a rotating electric machine (36) coupled to the engine, and the rotating electric machine may be arranged forward of the engine in the fuselage.

According to such a configuration, it is possible to prevent the rotating electric machine from being overheated by heat generated by the engine.

Supplementary Note 4

In the aircraft according to Supplementary note 2 or 3, the electronic device may include the power conversion device or an electrical power device (33) configured to supply power from the rotating electric machine to the motor.

According to such a configuration, it is possible to prevent the power conversion device or the electrical power device from being overheated by heat generated by the engine.

Supplementary Note 5

In the aircraft according to Supplementary Note 4, the cooling unit may include a first cooling unit (44, 48) and a second cooling unit (46, 50) and the cooling fan may include a first cooling fan of the first cooling unit and a second cooling fan of the second cooling unit, the air delivered to the interior of the fuselage by the first cooling fan may be guided to the electronic equipment, and the air delivered to the interior of the fuselage by the second cooling fan may be guided to the rotating electric machine.

According to such a configuration, the first cooling fan can cool the electronic equipment suitably. Further, the second cooling fan can cool the rotating electric machine suitably.

Supplementary Note 6

In the aircraft according to Supplementary Note 5, the first cooling unit and the electronic equipment may be disposed to face each other.

According to such a configuration, the air taken into the fuselage by the first cooling fan can be smoothly guided to the electronic equipment.

Supplementary Note 7

In the aircraft according to Supplementary Note 6, the first cooling unit may be provided in plurality and arranged so as to sandwich the electronic equipment from both sides in a left-right direction of the fuselage.

According to such a configuration, it is possible to cool the electronic equipment more suitably.

Supplementary Note 8

In the aircraft according to any one of Supplementary Notes 5 to 7, the second cooling unit and the rotating electric machine may be disposed to face each other.

According to such a configuration, the air taken into the fuselage by the second cooling fan can be smoothly guided to the rotating electric machine.

Supplementary Note 9

In the aircraft according to any one of Supplementary Notes 1 to 8, the exhaust orifice may include a fuselage exhaust orifice (70) provided at a rear end portion of the fuselage.

According to such a configuration, the fuselage exhaust orifice can be arranged rearward of the engine in the fuselage with a simple configuration.

Supplementary Note 10

In the aircraft according to any one of Supplementary Notes 1 to 9, a wing portion (60*a*, 60*b*) having a control surface (62*a*, 62*b*) may be connected to the fuselage, a communication passage (64*a*, 64*b*) in communication with the interior of the fuselage may be formed inside the wing portion, a drive control unit (66*a*, 66*b*) configured to control driving of the control surface may be disposed in the communication passage, and the exhaust orifice may include a wing vent (72*b* 72*a*) provided in the wing portion.

According to such a configuration, the air taken into the fuselage by the cooling fan can cool the drive control unit suitably.

Moreover, it should be noted that the present invention is not limited to the embodiments described above, but a variety of configurations may be adopted therein without departing from the essence and gist of the present invention.

The invention claimed is:
1. An aircraft comprising:
a fuselage;
an engine disposed in an interior of the fuselage;
an exhaust orifice;
a rotating electric machine coupled to the engine,
wherein
inside the fuselage, a cooling unit including a radiator and a cooling fan are provided, the radiator being configured to cool at least one of a motor that generates a thrust on the aircraft or a power conversion device that supplies power to the motor, the cooling fan being configured to supply air outside the fuselage to the radiator and deliver the air to the interior of the fuselage, the exhaust orifice being configured to discharge the air delivered to the interior of the fuselage,
the cooling unit is arranged forward of the engine in the fuselage,
the exhaust orifice is arranged rearward of the engine in the fuselage,
in the interior of the fuselage, electronic equipment including an electronic device is arranged forward of the engine,
the rotating electric machine is arranged forward of the engine in the fuselage, and
the electronic equipment includes the power conversion device or an electrical power device configured to supply power from the rotating electric machine to the motor.

2. The aircraft according to claim 1, wherein
the cooling unit includes a first cooling unit and a second cooling unit, and the cooling fan includes a first cooling fan of the first cooling unit and a second cooling fan of the second cooling unit,
the air delivered to the interior of the fuselage by the first cooling fan is guided to the electronic equipment, and
the air delivered to the interior of the fuselage by the second cooling fan is guided to the rotating electric machine.

3. The aircraft according to claim 2, wherein the first cooling unit and the electronic equipment are arranged to face each other.

4. The aircraft according to claim 3, wherein the first cooling unit is provided in plurality, and arranged so as to sandwich the electronic equipment from both sides in a left-right direction of the fuselage.

5. The aircraft according to claim 2, wherein the second cooling unit and the rotating electric machine are arranged to face each other.

6. The aircraft according to claim 1, wherein
a wing portion including a control surface is connected to the fuselage,
a communication passage in communication with the interior of the fuselage is formed inside the wing portion,
a drive control unit configured to control driving of the control surface is disposed in the communication passage, and
the exhaust orifice includes a wing vent provided in the wing portion.

7. The aircraft according to claim 1, wherein the exhaust orifice includes a fuselage exhaust orifice provided at a rear end portion of the fuselage.

8. An aircraft comprising:
a fuselage;
an engine disposed in an interior of the fuselage;
an exhaust orifice;
a rotating electric machine coupled to the engine, wherein
inside the fuselage, a cooling unit including a cooling fan is provided, the cooling fan being configured to deliver to the interior of the fuselage air outside the fuselage for cooling at least one of a motor that generates a thrust on the aircraft or a power conversion device that supplies power to the motor, the exhaust orifice being configured to discharge the air delivered to the interior of the fuselage,
the cooling unit is arranged forward of the engine in the fuselage,
the exhaust orifice is arranged rearward of the engine in the fuselage,
in the interior of the fuselage, electronic equipment including an electronic device is arranged forward of the engine,
the rotating electric machine is arranged forward of the engine in the fuselage, and
the electronic equipment includes the power conversion device or an electrical power device configured to supply power from the rotating electric machine to the motor.

* * * * *